United States Patent [19]
Kurihara

[11] Patent Number: 4,720,185
[45] Date of Patent: Jan. 19, 1988

[54] DRIVE AND SUPPORT STRUCTURE OF AN OBJECTIVE LENS

[75] Inventor: Toshihiko Kurihara, Tokorozawa, Japan

[73] Assignee: Pioneer Electronic Corporation, Tokyo, Japan

[21] Appl. No.: 754,220

[22] Filed: Jul. 12, 1985

[30] Foreign Application Priority Data

Jul. 13, 1984 [JP] Japan .......................... 59-105880[U]

[51] Int. Cl.⁴ .............................................. G02B 7/04
[52] U.S. Cl. ..................................................... 350/255
[58] Field of Search ............................... 350/247, 255; 369/44–45; 310/14, 194

[56] References Cited

U.S. PATENT DOCUMENTS

| | | | |
|---|---|---|---|
| 4,473,274 | 9/1984 | Yano et al. | 350/255 |
| 4,554,653 | 11/1985 | Malissin et al. | 350/247 |
| 4,557,564 | 12/1985 | Van Rosmalen | 350/247 |
| 4,566,089 | 1/1986 | Kime | 350/255 |
| 4,596,448 | 6/1986 | Kikuchi | 350/255 |

Primary Examiner—William H. Punter
Attorney, Agent, or Firm—Fleit, Jacobson, Cohn & Price

[57] ABSTRACT

A drive and support structure of an objective lens, for an optical information reading system for example, has a very much simplified construction. An objective lens and a focusing coil fixed thereto is placed in a hollow space formed in a magnetic circuit without any pole piece projecting into the focusing coil generally used in conventional arrangements. With this simplified construction, the total weight of driven parts is vary much reduced to improve a follow-up characteristic of a focus servo control system. At the same time, the size of the drive and support structure is made much smaller than conventional arrangement both in its diameter and its height.

3 Claims, 5 Drawing Figures

DRIVE AND SUPPORT STRUCTURE OF AN OBJECTIVE LENS

BACKGROUND OF THE INVENTION

1. Field of the invention

The present invention relates to a drive and support structure of an objective lens, and more specifically to a drive and support structure of an objective lens of a pickup unit of a system for optically reading recorded information.

2. Description of Background Information

In systems for optically reading recorded information, an operation of an optical pickup unit is such that it focuses a reading laser beam on a recording track of a recording medium and it receives a reflected laser beam from the recording medium. The recorded information is recovered from the recording medium in terms of the change in the reflection of the irradiated reading laser beam. In the operation of the optical pick up unit, it is necessary that the reading laser beam is correctly focused on the recording track irrespectively of the fluctuation of the level of the recording surface relative to the pickup unit, for instance, caused by a curvature of the recording medium. Therefore, the optical pickup unit is provided with a drive and support structure of the objective lens which moves the objective lens in a direction perpendicular to the recording surface within a relatively small amplitude.

The drive and support structures of an objective lens presently in use are constructed such that a pole piece of a magnetic circuit is inserted into a space between the objective lens and a bobbin of a focusing coil fixed to the objective lens and having a diameter greater than that of the objective lens.

However, this type of construction is disadvantageous in that the total weight of the driven parts, i.e. the objective lens, the focusing coil, and the bobbin becomes relatively large, which in turn adversely affects the response charcteristic of the focus servo system. Further, it is also disadvantageous that the diameter and the height of the drive and support structure are large. This problem of the large size of the drive and support structure of the lens has been a major cause which prevents the total reduction of the size of the information playback system. In addition, there is also a disadvantage that the assembling of the drive and support structure is rather difficult due to the complicated structure.

OBJECT AND SUMMARY OF THE INVENTION

The present invention is made in view of the above disadvantages of the support structures presently in use. An object of the present invention is therefore to provide a drive and support structure of an objective lens by which a good follow characteristics of the focus servo system is assured. Another object of the invention is to provide a drive and support structure of an objective lens which has a relatively simple construction so that the size of the drive and support structure is sufficiently reduced and is able to be assembled without difficulty.

According to the present invention, the drive and support structure of an objective lens comprises an objective lens for applying a light beam on a recording surface of a recording medium, a support mechanism for supporting the objective lens so that an optical axis of the objective lens is perpendicular to the recording surface, while permitting a displacement of the objective lens along a direction of the optical axis, and a drive means for driving the objective lens in the direction of optical axis, including a coil fixed to the objective lens so that a central axis of the coil is substantially parallel with the optical axis and a magnetic circuit provided so as to surround or enclose the coil and producing magnetic fluxes crossing the coil.

Further scope and applicability of the present invention will become apparent from the detailed description given hereinafer. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

Figure 1:
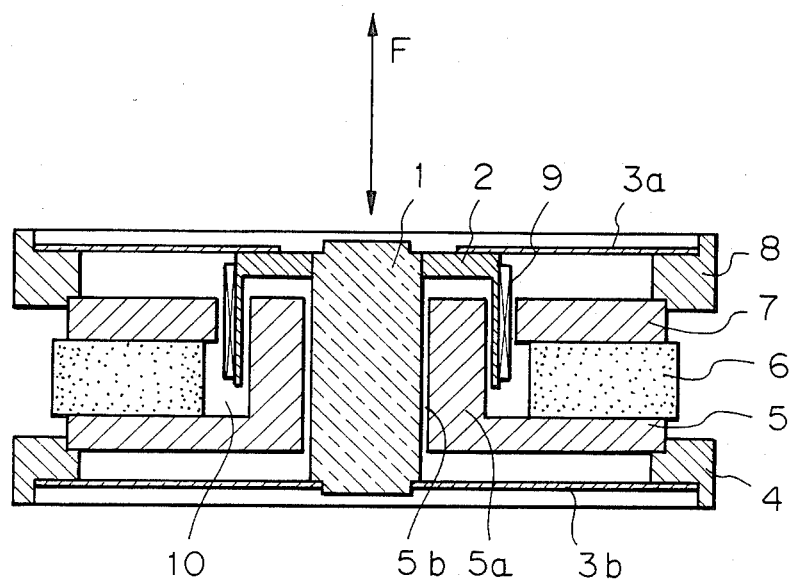
FIG. 1 is a cross sectional view showing an example of the structure of the conventional drive and support structure of an objective lens.

Before considering the details of the drive and support structure of an objective lens proposed herein and its advantages over the prior art, reference is directed to the cross-sectional view of FIG. 1, in which the construction of a conventional drive and support structure of an objective lens is illustrated.

As shown, an objective lens 1 is supported by means of a plurality of leaf springs such as a pair of leaf springs, i.e., upper and lower leaf springs 3a and 3b which are connected to an upper end portion of the objective lens 1 via an upper flange of a bobbin 2, and a lower end of the objective lens 1 respectively. By this arrangement, the objective lens 1 is movable along an optical axis, that is, in directions of focusing operation indicated at an arrow F in the figure, within a predetermined range of movement. The lower leaf spring 3b is supported by a spring stay 4 on which a magnetic circuit consisting of a yoke 5, a ring-shaped magnet 6, and an annular yoke plate 7 is mounted. The upper leaf spring 3a is supported by the yoke plate 7 via a spring stay 8. A focusing coil 9 is wound around the bobbin 2 so that a central axis of the focusing coil 9 is substantially on the optical axis of the objective lens 1. The bobbin 2 with the focusing coil 9 is inserted in a magnetic gap 10 formed between an inner circular edge of the yoke plate 7 and a pole portion 5a of the yoke 5 which projects upward at the central part of the yoke 5. At the same time, the objective lens 1 is inserted into a through hole or bore 5b of the yoke 5 whose diameter is slightly larger than that of the objective lens 1.

In the magnetic gap 10, the magnet 6 produces an almost parallel magnetic flux directed to the pole portion 5a of the yoke 5 facing an inner peripheral surface of the magnet 6. Therefore, the focusing coil 9 is placed in the magnetic gap 10 so that it crosses the magnetic flux at right angles. By supplying a suitable drive current to the focusing coil 9, a drive force is generated and the objective lens 1 is moved in the directions indicated at the arrow F.

In the case of this drive and support structure of an objective lens according to the conventional technique, the pole portion 5a as a part of the magnetic circuit is inserted into the bobbin 2. Moreover, the objective lens 1 is inserted into the bore 5b formed in the pole portion 5a.

Therefore, as mentioned before, the size of the bobbin 2 and the focusing coil 9 become inevitably large. As a result, the weight of the driven part including the objective lens 1 and the bobbin 2 becomes large and the follow-up characteristic during a focus servo control operation is adversely affected by this large weight. Further, there is a drawback that the total size of the drive and support structure becomes large especially in directions of its diameter. Moreover, it is also a problem that the assembling of this drive and support structure is difficult because the objective lens 1 is supported by the upper and lower leaf springs 3a and 3b after it is inserted into the bore 5a of pole portion 5b. In this connection, the length of the objective lens 1 must be at least greater than the height of the pole portion 5a, which has been resulted in an increase of the height of the overall structure.

Preferred embodiments of the drive and support structure of an objective lens according to the present invention will be discussed hereinafter with reference to FIGS. 2 through 5 of the accompanying drawings.

Figure 2:
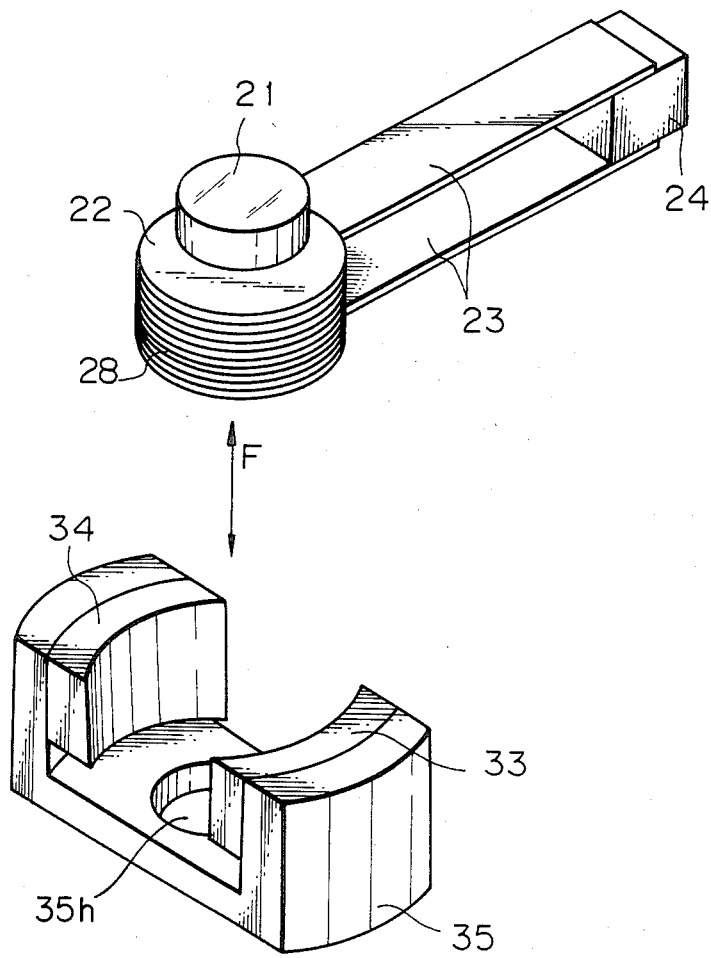
FIG. 2 is an exploded perspective view of a drive and support structure of an objective lens according to the present invention.
Figure 3:
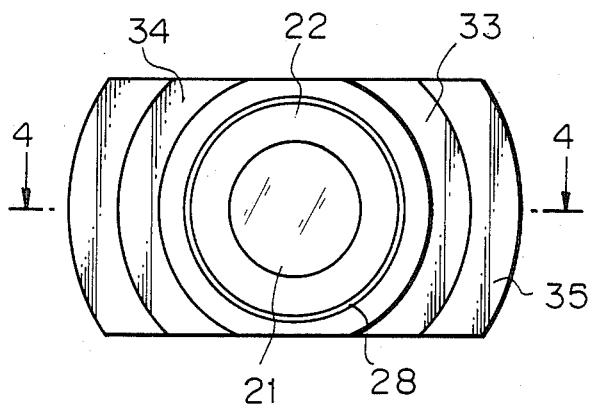
FIG. 3 is a plan view of the drive and support structure of an objective lens of FIG. 2.

In FIG. 2, an objective lens 21 is provided for applying a light beam on a recording surface of a recording medium such as a digital audio disc (not illustrated). The objective lens 21 is supported by a support mechanism which comprises a bobbin 22 of substantially cylindrical form, a pair of leaf springs 23, and a block 24. Specifically, the leaf springs 23 are arranged in parallel with each other and connected to the upper and the lower ends of the bobbin 22 respectively. With this support mechanism, the objective lens 21 is allowed to move along its optical axis, that is, in directions of focusing indicated at an arrow F in the figure, within a predetermined range of movement. At the same time, the objective lens 21 is supported by this support mechanism so that the optical axis thereof is maintained to be perpendicular to the recording surface of the digital audio disc.

Figure 4:
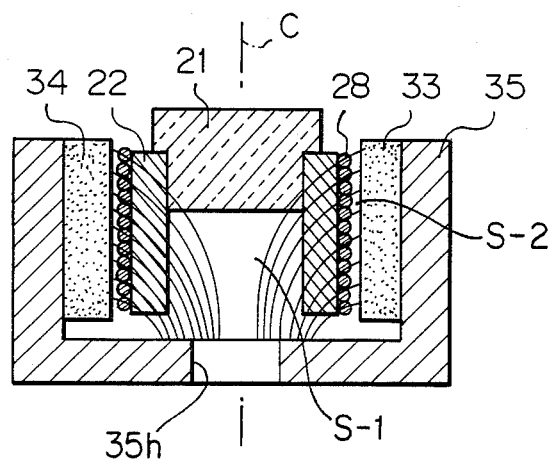
FIG. 4 is a cross-sectional view of the drive and support structure of an objective lens, taken along lines IV—IV of FIG. 3.

A focusing coil 28 is wound around the bobbin 22 so that a central axis of the coil 28 is on the optical axis of the objective lens 21. As is shown in FIG. 4, an inner space S-1 of the bobbin 22 and the surrounding coil 28 is reserved as a vacant space to accommodate the objective lens 21 and the light beam which passes therethrough. When the objective lens 21 with its support is placed in the operating position, the focusing coil 28 is located in a hollow vacant space S-2 formed in a magnetic circuit made up of a pair of confronting magnets 33 and 34 and a yoke 35. The yoke 35 has two curved spaced upright wall portions extending perpendicularly from opposite ends of a bottom plate portion. In other words, the yoke 35 has the form of a cylinder with a bottom and two symmetric lateral cut out portions. The magnets 33 and 34 have the form of a part of a cylinder and fixed to inner surfaces of the upright wall portions of the yoke 35. Thus a cylindrical hollow space is formed in the magnetic circuit and the diameter of this cylindrical hollow space is determined a little greater than the diameter of the focusing coil 28. Further, a hole 35h is provided in the bottom plate of the yoke 35 so as to allow the transmission of lights which pass through the objective lens 21. The spatial relation between the focusing coil 28 supporting the objective lens 21 with respect to the magnetic circuit when it is placed in the operating position is illustrated in the plan view of FIG. 3. In the operating position, the leaf springs 23 are located in one of the cut out portions of the yoke 35 so that the vertical movement of the objective lens 21 is enabled by the bending of the leaf springs 23. Thus the drive means for moving the objective lens 21 in the focusing directions is made up of the focusing coil 28 and the magnetic circuit consisting of the yoke 35 and the magnets 33 and 34 which surrounds an outer side of the focusing coil 28.

The magnets 33 and 34 produce magnetic fluxes crossing the focusing coil 28 which are indicated by curved lines in the cross-sectional view of FIG. 4. Specifically, the magnetic fluxes are made symmetric with respect to a vertical central plane indicated at C of the yoke 35. Therefore, by supplying a suitable current to the focusing coil 28, the objective lens 21 is moved along focusing directions which are indicated at the arrows F in FIG. 2. It will be noted, that with the configuration of the magnetic circuit and the focusing coil according to the present invention, a pole piece inserted into the focusing coil which has been required in the conventional arrangement is thoroughly eliminated.

Further, the construction of the support of the objective lens 21 is not limited to the above example using a pair of leaf springs 23.

Figure 5:
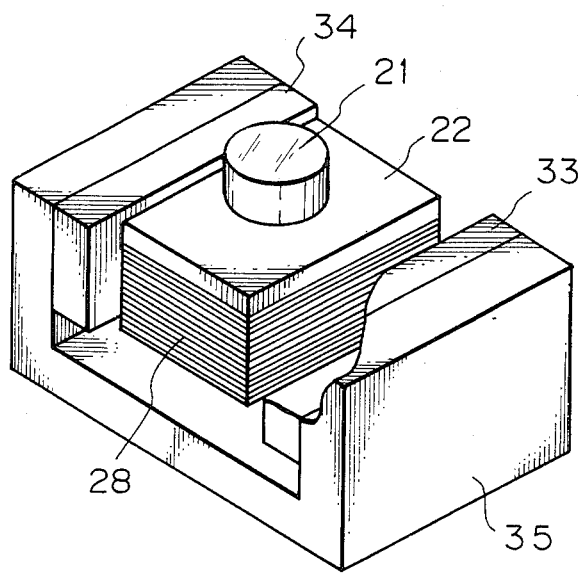
FIG. 5 is a perspective view showing another embodiment of the drive and support structure of an objective lens according to the present invention in which a square focusing coil is utilized.

FIG. 5 shows a second embodiment of the drive and support structure of an objective lens according to the present invention.

This embodiment is characterized in that the bobbin 22, the focusing coil 28, and the magnetic circuit including the yoke 35 and the magnets 33 and 34 are made rectangular form. With this configuration, the production of the magnets 33 and 34 and the yoke 35 becomes easier than the curved ones of the previous embodiment. Further, the assembling of the magnetic circuit becomes much easier than the previous embodiment.

It will be appreciated from the foregoing, according to the present invention, the drive and support structure of an objective lens has a magnetic circuit which is arranged to surround an outer side of the focusing coil. Therefore, the size of the bobbin and the focusing coil is made much smaller than the conventional arrangement in which a part of the magnetic circuit is inserted into a space in the bobbin around which the focusing coil wound.

Therefore, the weight of the driven part comprising the objective lens and the bobbin is very much lowered so that the follow-up characteristic of the objective lens during the focus servo control operation is very much improved. Further, the overall structure of the drive and support structure of an objective lens becomes much smaller than the conventional structure. Moreover, there is an important advantage that the assembling process becomes very much easier since no part of the magnetic circuit is inserted into the space in the focusing coil, or in other words, the objective lens is no more inserted into the pole piece of the magnetic circuit. In this connection, the length of the objective lens can be shortened to a minimum limit. Thus, an overall cut down of the size of the drive and support structure of an objective lens is made very easy.

What is claimed is:

1. A drive and a support structure of an objective lens comprising:

an objective lens for applying a light beam on a recording surface of a recording medium;

a support mechanism for supporting said objective lens so that an optical axis of said objective lens is perpendicular to said recording surface, while permitting a displacement of said objective lens along a direction of said optical axis; and a drive means for driving said objective lens in said direction of said optical axis, including a focusing coil on which said objective lens is mounted so that a central axis of said coil is substantially parallel with said optical axis, and a magnetic circuit including magnets and a yoke having a surface generally perpendicular to magnetic surfaces of said magnets and arranged to surround and face an outer side of said coil and producing magnetic fluxes crossing said coil, with an inner space of said coil being reserved as a vacant space to accomodate the objective lens and the light beam which passes therethrough.

2. A drive and support structure as set forth in claim 1, wherein said yoke of said magnetic circuit has a generally U-shaped cross-section with a hole in a bottom portion thereof which defines said perpendicular surface, and said magnets are a pair of magnets fixed in said yoke, said magnets being arranged to confront each other and forming a vacant space therebetween and producing magnetic fluxes which are symmetric with respect to a central plane of said yoke, and said objective lens and said focusing coil connected thereto are placed in the vacant space formed in said magnetic circuit.

3. A drive and support structure as set forth in claim 2, wherein:

said generally U-shaped yoke has spaced wall portions extending perpendicularly from opposite ends of said bottom portion and defining at least one lateral cut out portion between said wall portions, with said confronting magnets being arranged adjacent said wall portions; and said support mechanism includes an essentially cylindrical support member defining part of said focusing coil and on which said objective lens is received, and having an axis parallel to the optical axis of said lens and the hole in the bottom of said U-shaped yoke, with said coil surrounding said support member, and further includes a pair of spaced resilient parallel leaf springs secured to said support member adjacent opposite ends of said support member and extending essentially perpendicular to the optical axis of said lens and the axis of said support member through the at least one lateral cut out portion in said U-shaped yoke.

* * * * *